Sept. 13, 1932.   H. L. ARSTE   1,876,576
DOORKNOB LOCK
Filed Jan. 8, 1930   4 Sheets-Sheet 1

INVENTOR
H. L. ARSTE
BY ATTORNEYS

Sept. 13, 1932.  H. L. ARSTE  1,876,576
DOORKNOB LOCK
Filed Jan. 8, 1930  4 Sheets-Sheet 2

INVENTOR
H.L. ARSTE
BY Hazard and Miller
ATTORNEYS

Sept. 13, 1932.　　　H. L. ARSTE　　　1,876,576
DOORKNOB LOCK
Filed Jan. 8, 1930　　　4 Sheets-Sheet 4

INVENTOR
H. L. ARSTE
BY *Hazard and Miller*
ATTORNEYS

Patented Sept. 13, 1932

1,876,576

UNITED STATES PATENT OFFICE

HENRY L. ARSTE, OF ALHAMBRA, CALIFORNIA

DOORKNOB LOCK

Application filed January 8, 1930. Serial No. 419,389.

My invention pertains to a door knob lock of the type in which an outer knob is provided with a lock usually of the rotatable barrel type, the operation of the said lock being adapted to lock or unlock a latch bolt or the like.

An object of this invention is a construction by which when the latch bolt is locked, a partial rotation of the inner knob may unlock or release the said latch bolt, the latch bolt being operable under any circumstances by the inner knob to open the door and when released by partial rotation of the inner knob, the latch bolt may be operable by the outer knob to open or close the door.

Another object of my invention is having a releasing device operably connected to the inner knob, whereby after releasing of the latch bolt, the said releasing device may be operated to again lock the latch bolt independent of the lock in the outer knob.

Another object and feature of my invention is having the releasing device in the inner knob in the form of an elongated bar-like trigger; this trigger being shiftable in one direction by the operation of the lock in the outer knob to latch the trigger and hence prevent movement of the latch bolt, or the said lock being operable to unlatch the said trigger, there being a spring means to move the trigger into its releasing position. Such trigger is moved outwardly in reference to the inner knob on unlocking of the bolt and thrusting of this trigger inwardly in cooperation with the detent means to restrain the trigger in its innermost position again locking the latch bolt.

A further detailed object and feature of my invention is providing the lock with a tubular cage which may be fitted in a cylindrical opening in a door having a bolt housing connected to said cage to fit in an opening from the marginal edge of the door; this housing forming a means to prevent rotation of the cage, and in cooperation with the above structure I utilize a slidable latch bolt in the bolt housing, an outer and an inner knob on the opposite sides of the cage, the outer knob preferably having a lock.
There is a trigger extending longitudinally through the inner knob of the cage and into a position to be actuated by the said lock, together with a detent under influence of the lock; the detent restraining the trigger. There is a slidable cross head in the cage connected to the latch bolt and adapted to be restrained from movement by the trigger to lock the said latch bolt.

In this connection, the trigger and detent are so constructed that the operation of the outer lock may draw the trigger inwardly. The detent engaging the trigger or the lock may operate the detent to release the trigger and move the trigger outwardly, thereby releasing the catch, or if the latch bolt is locked with the trigger innermost, a partial rotation of the inner knob releases the detent and permits outward movement of the trigger to unlock the cage, whereby both knobs may operate such cage and the latch bolt.

Another detailed object and feature of my invention is a door knob lock in which if desired, the outer knob may be discarded or may have no lock therein and in which the inner knob has means cooperating therewith to lock a bolt in its locking position and by a partial rotation of such knob releasing the bolt on opening or closing the door. And in this connection I utilize a trigger-like device preferably with a detent, the trigger-like device being slidable longitudinally of the inner knob and positioned when innermost to lock the bolt and on partial rotation of the knob the detent being actuated to release the trigger and thereby unlock the bolt.

Another feature of my invention is having a molding cap on the knobs fitting against the surface of the door and giving an ornamental closure feature for the lock mechanism housed in the door and in this connection one of the molding caps is held in position by attachment to a cage-like structure fitted in the door and the other is retained in place by a spring connection to the cage-like structure.

My invention is illustrated in connection with the accompanying drawings, in which.

The lock has an outside knob 11 with a lock indicated generally by the numeral 12 therein. This lock has a rotatable barrel 13 operated by a key and may be of the usual type used in the door knob type of latch. The knob has a tubular inward extension 14 with a cylindrical socket 15 therein. There is an outwardly turned flange 16, which flange is secured at its inner portion to the upper section 14 by a riveted connection and the flange fits inside of a flat ring 17. A tubular sleeve 18 is rotatably mounted on the tubular part 14 of the handle. This sleeve has an annular rib 19 and the rib engages the outer part of a molding 20, the molding being secured at its outer edge 21 to a plate 22 and the latter plate being secured to the ring 17 by screws 23 or the like. (Note particularly Fig. 1.)

Figure 6:
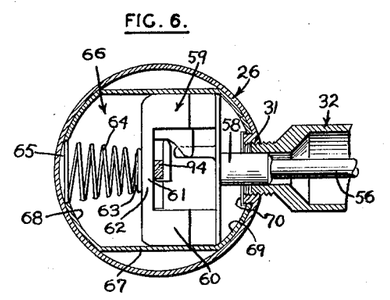
Fig. 6 is a section similar to Fig. 2 with parts shown in elevation and in the same position.
Figure 7:
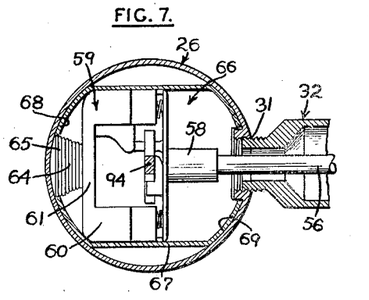
Fig. 7 is a view similar to Fig. 6 with the parts in a different position.

The ring 17 at the outer portion has a threaded connection 24 to a cylindrical cage 25, which cage has a snug fit in the cylindrical opening 26 in the body of the door structure 27. (Note particularly Figs. 1 and 2.) There are two pins 28 projecting inwardly from the flange 16 for a purpose hereinunder detailed. This flange is provided with a notch 29 and part of the tubular portion 14 and the sleeve 18 with a slot 30; the notch and the slot being in alignment and are for a purpose hereinunder detailed. The cage 25 is provided with an inwardly threaded opening 31 (note Figs. 1, 6 and 7), in which is fitted a tubular bolt housing 32 (note Fig. 8). This housing has a reduced threaded end 33 engaging the threads 31 and an enlarged cylindrical section 34 which fits in a cylindrical opening 35 in the door and extending to the edge face 36 of the door. This tubular housing has opposite lateral flanges 37 which engage the face 38 of a cut-out section on the edge of the door and on opposite sides of the tube there are elongated slots 39 extending inwardly from the flanges 37.

Fitting in the cylindrical lateral opening of the door 35 there is a bolt guide fixture designated generally at 40 (note particularly Figs. 1, 2 and 9), which has a face plate 41 fitting against the cut-out face 38 of the door and has a portion 42 flattened on the outside which engages the edges 43 of the slots 39 in the upper bolt housing 32. The inner end of the bolt guide 44 fits against the edge 45 of the housing 32 (note Fig. 8.) The bolt guide has two flat sides 46 on the inside and two curved sides 47. These are to accommodate the latch bolt 48 which is made of a corresponding shape and this latch bolt has a bevelled edge 49 and is provided with a slot 50. A face plate 51 (note Fig. 10) has an opening 52 corresponding to the shape of the latch bolt 48 and is provided with screw apertures 53 which register with the screw apertures 54 of the face plate 41, so that these two face plates may be secured by screws 55 securely to the door as indicated in Fig. 2. An operating shank 56 is connected to the latch bolt 48, this fitting in the socket 50 and being secured by the pin 57.

Figure 15:
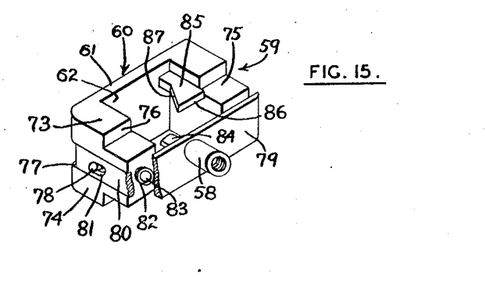
Fig. 15 is a perspective view of the box-like cross head to which the latch bolt is connected.

The inner end of the shank 56 is screw threaded and fits in a screw threaded socket member 58 which is attached to a cross head designated generally by the numeral 59 and illustrated in detail in Fig. 15, also Figs. 1, 2, 6 and 7. This cross head has a U-shaped main member 60, which has a base 61 with a flat inner surface 62, of which there is a slight nub 63 for centering of the spring 64.

This spring extends through an opening 65 in an inner box-like guide structure designated generally by the numeral 66. Such box structure has two flat side walls 67, a curved portion 68 in which there is the opening 65 and a second curved portion 69 with an opening 70 which fits around the screw threaded section 31 of the cage 25. (Note particularly Fig. 6.) The box guide has a flat plate 71 riveted thereto, which plate has an arcuate slot 72 therein (note Fig. 4).

The side arms 73 of the U-shaped portion of the cross head 59 have bearing surfaces 74 (note Fig. 15), which slide on the inside of the side walls 67 of the box guide. They have notches 75 on opposite sides, these notches having shoulders 76 to be engaged by the pins 28 and the pins on the opposite side of the lug, in the manner hereinunder detailed. On each side of the U-shaped section of the cross head there are slots 77 which have a pin 78 projecting therefrom and a movable cap piece 79 has arms 80 forming a U-shaped construction which arms fit in the slot 77 and have elongated slots 81 to engage the pins 78. In the ends of the arms 73 of the U-shaped base portion 60, there are sockets 82 with springs 83. These springs bear against the plate 79 and tend to always separate such parts; the limiting motion being by the pins 78 and slots 81. The socket member 58 is secured to the plate 79, extending inwardly from this plate there is a finger 84 hereinunder detailed, and on one of the sides 73 there is a cam structure 85 having an outer edge 86 parallel to the plate 79 and a bevelled edge 87 (note details in Fig. 15).

Figure 1:
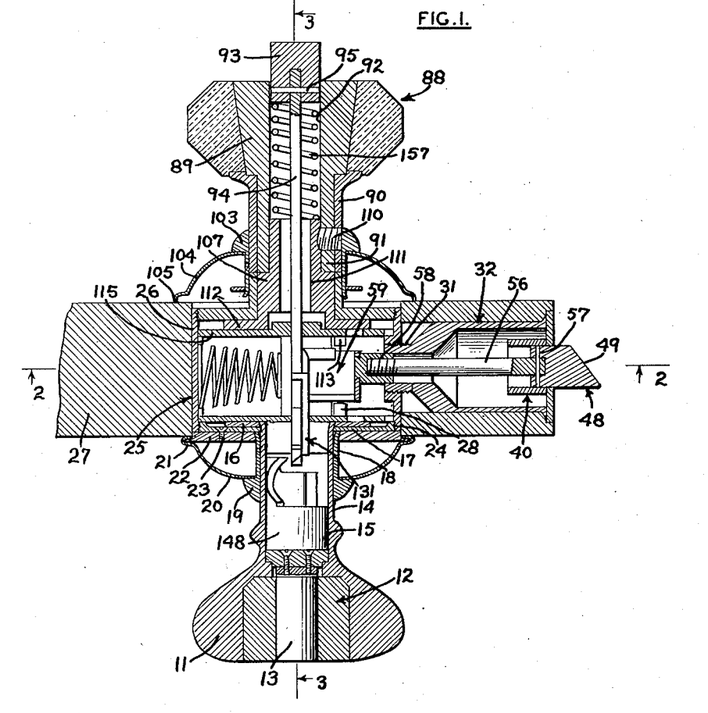
Fig. 1 is a horizontal section through the lock and door, taken substantially on the line 1—1 of Fig. 2 with certain interior parts shown in elevation.
Figure 2:
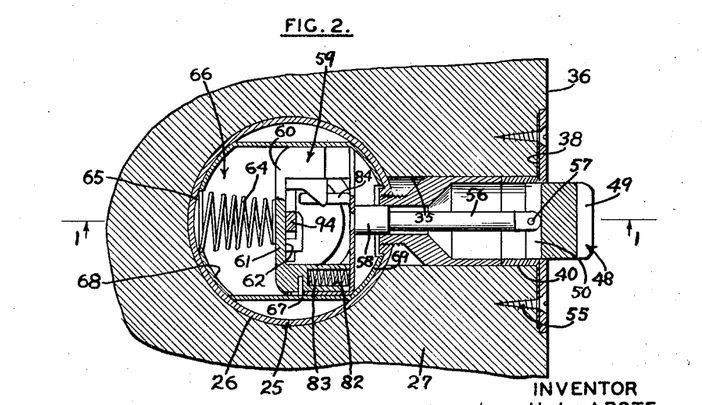
Fig. 2 is a vertical section through the lock, taken substantially on the line 2—2 of Fig. 1 in the direction of the arrows, with certain interior parts in elevation.
Figure 3:
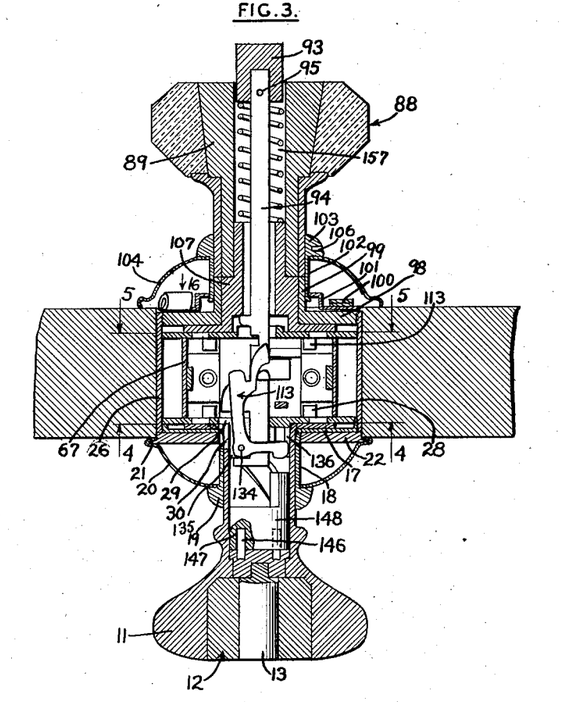
Fig. 3 is a vertical transverse section of the lock, taken on substantially the line 3—3 of Fig. 1 in the direction of the arrows, with certain interior parts shown in elevation.
Figures 16, 19, 20, 21:
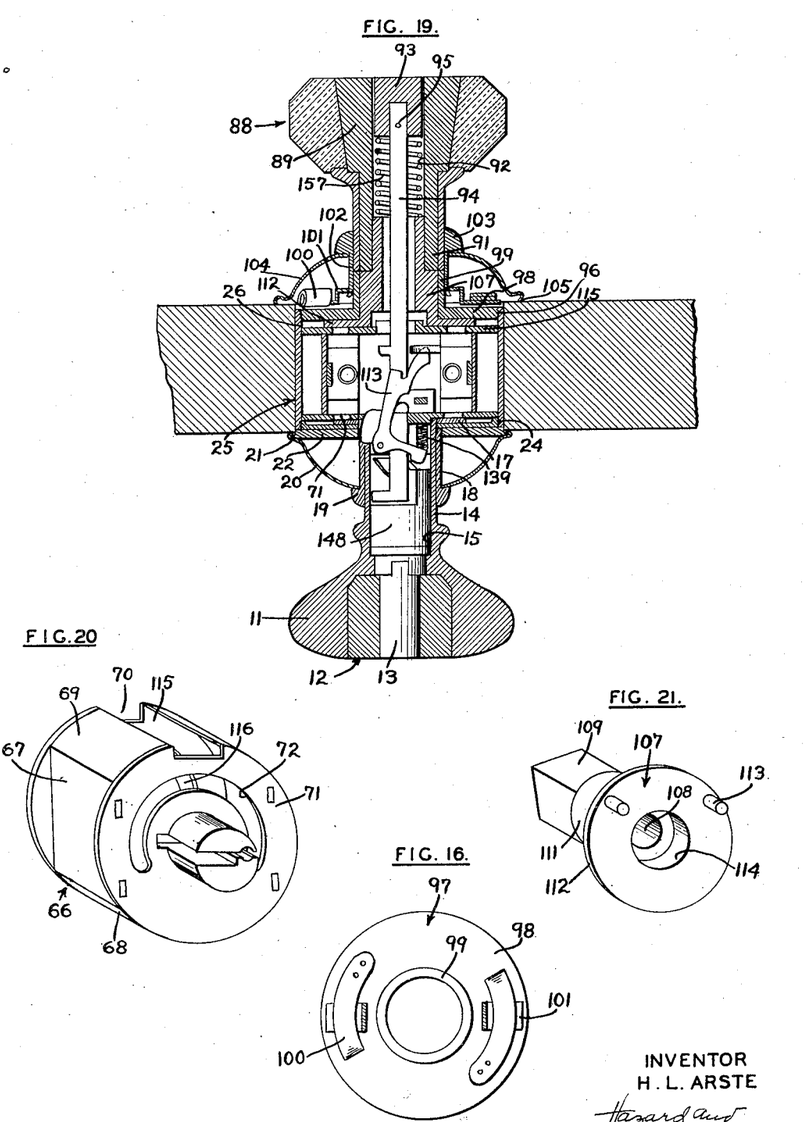
Fig. 16 is a detail elevation taken in the direction of the arrow 16 of Fig. 3, with the cover molding removed.
Fig. 19 is a view similar to Fig. 3 in the locking position.
Fig. 20 is a detail perspective view of the box-like guide.
Fig. 21 is a detail perspective view of a rotatable member operated by the inner knob.

On the inside of the door there is a handle knob 88 (note Figs. 1 and 3). This knob is illustrated as being formed in part of glass and has an inner tubular body 89 secured thereto and a sleeve 90 fixed to the body. The portion 91 of the inner tubular body is squared for a purpose hereinunder detailed and the outer portion 92 is preferably cylindrical and houses a cylindrical slidable button 93. This button has a trigger designated generally by the numeral 94 connected thereto, the connection being by a pin 95. The marginal edge 96 of the cage 25 has a screw threaded connection with a cap piece 97 (note particularly Figs. 1, 3 and 16). This cap piece has a ring-like section 98 and a tubular section 99 and by the screw threaded connection this cap piece is held in tight relation to the cage 25 which is fixed in the opening 26 of the door. On the outer surface of this cap piece there are two springs 100, which springs engage a pair of arms 101 which extend laterally from the loose sleeve 102 which sleeve fits on the outside of the tubular portion 99 of the cap and the sleeve 90 of the knob 88. This sleeve has a rim 103 at its outer edge, the rim engaging the outer surface of a molding cap 104, which cap at its edge 105 bears against the hood of the door and forms a neat finish. A pin hole 106 in the rim 103 may be utilized to turn the arms 101 in relation to the spring 100 and to release them from such springs for disassembling the lock and in the reverse arrangement for assembling the lock. (Note particularly Figs. 1 and 3.)

To operate the lock from the inner knob 88 there is a rotatable member designated generally by the numeral 107. This has an opening 108 therethrough and at the outer portion 109 is squared, fitting in the squared portion 91 and may be gripped by a set screw 110 (note Fig. 1). A cylindrical section 111 fits inside of the cylindrical section 99 of the cap 97 and there is a laterally extending flange 112 on the inside of the cap, this flange having a pair of inwardly extending pins 113. There is also a recess 114 in this member; the pins 113 being for a purpose hereinunder detailed. The pins 113 extend through a cover plate 115 which is riveted to the guide box 65 which contains the sliding cross head. This cover plate has an arcuate slot 116 for the passage of the pins 113. (Note particularly Fig. 5.) In this cover plate 115 there is an opening 117 for passage of the trigger.

Figures 4, 5, 17, 18:
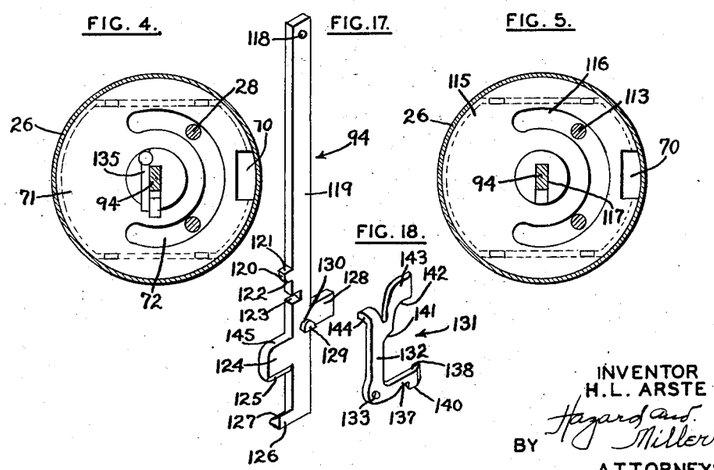
Fig. 4 is a transverse detail section on the line 4—4 of Fig. 3, taken in the direction of the arrows.
Fig. 5 is a detail transverse section on the line 5—5 of Fig. 3 in the direction of the arrows.
Fig. 17 is a perspective view of the trigger for locking the bolt.
Fig. 18 is a perspective view of the detent or dog for holding the trigger.

This trigger 94 illustrated particularly in Fig. 17 is a longitudinal bar and has a perforation 118 at one end to accommodate the pin 95 which secures it to the button 93. It has a rectangular shank portion 119 which is somewhat flattened and extending from one side there is a first nub 120 which has an abutment face 121 on one side at right angles to the edge of the shank section, and a curved face 122 on the other side. On the same edge of the trigger there is a rectangular notch 123. In the further position there is a large boss 124 extending from the same edge, this being designed to form a locking member, which boss has a rounded edge 125 on one side. At the bottom there is a laterally projecting finger 126 which is bevelled on its inner face 127, to be engaged by a hook-like cam hereinunder detailed. Extending from the opposite edge of the trigger there is a rectangular boss 128 and closely adjacent thereto on one side face there is a slight lateral shoulder nub 129. This is rounded on its outer face 130.

Cooperating with the trigger there is a detent designated generally by the numeral 131 (note particularly Figs. 1, 3 and 18). This detent has a shank section 132 and at one end of this shank section there is a perforation 133 for a pivot pin 134. This pivot pin extends through a slot 135 formed in a block 136 depending from the plate 71 of the box-like guide 66 (note Fig. 11). There is a lateral arm 137 on the detent, the upper surface 138 of which is engaged by a spring 139. The spring is fitted in the slot 135. A hook-like nub 140 is positioned on the opposite side from the spring 139. The shank 132 has an outwardly curved portion 141 which in one position of the trigger engages the nub 129 on such trigger and in another position of the trigger, this nub fits in a curved section 142 on a laterally extending inner end 143 of the detent. This end of the detent rides along side the trigger adjacent the parts 128 and the notch 123. A hook end 144 is formed on the shank portion of the detent and is bent laterally, being adapted to fit in the notch 123 of the trigger and to hold this in one position with the nub 129 fitting in the portion 141 of the detent and in another position this hook engages the inner surface 145 of the enlarged boss 124 of the trigger, when the boss 129 fits against the portions 142 of the detent.

In order to operate the detent and trigger from the lock in the knob 11, the rotatable barrel of the lock is provided with two pins 146, which pins fit into the recess 147 in a cylindrical loose cam 148. This loose cam has one side section 149 extending upwardly (note particularly Figs. 11, 12 and 13). One side of this is straight as indicated at 150 and the other portion has a hook-like curve 151 starting at the inner surface 152 of the cam block and terminating in a relatively sharp edge 153 at the inner portion. This edge 153 is formed by the surface 154 parallel to the surface 152 and partly around the cam there is a slight outward curve 155 and another flat section 156 which leads to the edge 150. As the cross head in sliding in the guide box must have a loose fit, it causes a slight rocking of the bolt shank 56. Therefore this bolt shank in fitting in the slot 50 may rock slightly on the pin 57.

The cross head 59 is shifted in the guide box by either the pin 28 on the outside handle 11 engaging the shoulder 76 on one side, or the pins 113 on the inside handle 88 engaging the shoulders 76 on the opposite side of the cross head. As this cross head moves, it shifts the bolt shank 56 and hence the latch bolt head 48, there being a lost motion due to the slot 81 and pins 78 of the cross head. When the bolt is in the locked position, a key having been used in the outer handle to lock the lock, the boss 124 fits in the slots 29 and 30 (note Fig. 17). It is therefore impossible for the cross head to be shifted in the box guide by the outer knob because said outer knob is locked from rotation. When in this position the end 144 of the detent fits in the notch 123 of the trigger and the cam 148 has been rotated so that the hook has been used to pull downwardly on the finger 126 of the trigger and then to release the key from the lock the cam 148 has been returned to the normal and neutral position of Fig. 12. In this locked position the nub 129 fits against the curved position 141 of the detent.

Should a person on the inside of the door wish to either open the door or to unlatch the same, this may be done by rotating the inner handle slightly, which action brings the pins 113 into engagement with the faces 76 of the cross head. Such action moves the cross head inwardly and brings the cam surface 87 of the cam 85 into engagement with the projecting end 143 of the detent and thrusts this detent from the position of Fig. 17 to the position of Fig. 3. In this action the hook end 144 of the detent is released from the notch 123 of the trigger. The spring 157 therefore pulls the trigger outwardly from the position of Fig. 19 to that of Figs. 1 and 3 and removes the boss 124 from the slots 29 and 30; hence allowing inward movement of the cross head and of the latching bolt. The outward movement of the trigger is limited by the nub 120 engaging the cylindrical section 111 in the recess 114 (note Fig. 3). When the trigger has been withdrawn in this manner, the button 93 projects inwardly and the bolt may be shifted in and out in the manner of a latch, either by the inside knob or the outside knob, these being rotated in the usual manner.

If it is again desired to lock the latch bolt in its locking position, the button 93 may be thrust inwardly. This causes the inward movement of the trigger at the same time the detent is pivoted from the position of Fig. 3 to that of Fig. 19, the detent bearing against the nub 129 and limiting the frictional bearing of the hooked finger 144 against the shank of the trigger until such trigger is pressed inwardly so that the hook end 144 again engages in the notch 123. This prevents turning of the outside knob, and the operation of the latch bolt thereby.

In order to prevent the latch bolt being forced inwardly by an instrument thrust between the door and the door jamb when the outer knob is dogged, the finger 84 functions to bear against the rectangular boss 128 extending sideways from the trigger. There fore the trigger forms a stop and prevents inward movement of the cross head and hence of the latch bolt. However, as above mentioned when the cross head is moved inwardly by the rotation of the inner knob, the cam surface 87 of the cam structure 85 operates sufficiently due to the lost motion of the plate 79 in relation to the body portion of the cross head, to cause the depression of the detent 132 and release of trigger 94 and hence causing the finger 84 to clear the boss 128.

When the lock is unlocked by use of the proper key in the outer knob, this action rotates the cam 148 and causes the upper portion 154 thereof and the sloping cam surface 155 (note Fig. 13) to contact with the nub 140 on the lower end of the detent (note Fig.

17). This shifts the detent from the position of Fig. 19 to that of Fig. 3 and allows the spring 157 to retract the trigger outwardly from the position of Fig. 19 to that of Figs. 1 and 3 and allowing unlocking of the latch bolt by the turning of the outside handle.

Figures 8, 9, 10, 11, 12, 13, 14:
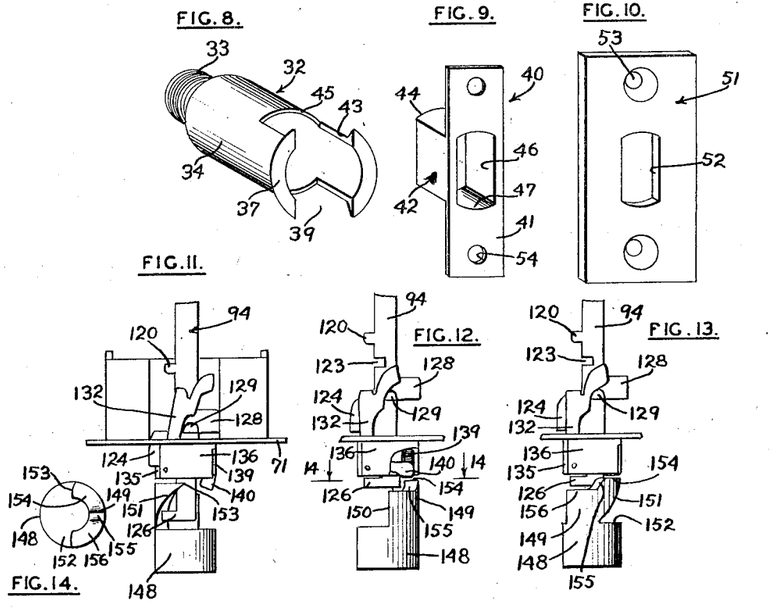
Fig. 8 is a perspective detail of the tube housing the latching bolt.
Fig. 9 is a perspective view of the bolt guide.
Fig. 10 is a perspective view of the edge plate fitting over the bolt and the bolt guide.
Fig. 11 is a detail elevation of the cam and box housing with part of the trigger.
Fig. 12 is a view similar to Fig. 11 with parts in another position.
Fig. 13 is a view similar to Figs. 11 and 12 with the parts in a still different position.
Fig. 14 is a section on the line 14—14 of Fig. 12 in the direction of the arrows, illustrating an end view of the cam.

In order to remove the key from the lock after the lock has been unlocked, the cam 148 is returned to its normal and neutral position of Fig. 12. In this case the abutment and the trigger are in their innermost position and the latch bolt can be operated by either handle. In some cases it is desirable to have the lock only operable from the inside and have no key for the outside knob, in which case the cam 148 can be omitted. Then a person on the inside of the door may lock the latch bolt by simply pressing in on the button 93 and may unlatch this by slightly turning the inner knob. This makes a construction suitable for what is sometimes known as bedroom or bathroom locks in which the locking and unlocking can only be done from the inside of the door.

Another feature of importance in my invention is in the manner of assembling and inserting in the door and holding the lock in the door. The tubular bolt housing 32 is inserted in the opening from the edge of the door and may be threaded in place by utilizing the face plate 40 as a wrench or by using a special wrench shaped for this purpose. As this tubular housing is rigidly secured to the cage 25, the cage and all the parts contained therein are held in a fixed position in the opening 26 in the door.

Various changes may be made in the principles of my invention without departing from the spirit thereof as set forth in the description, drawings and claims.

I claim:

1. A door knob lock having an outer and an inner knob on opposite sides of a door with a latch bolt extending beyond the edge of the door, a lock in the outer knob having means including a trigger device cooperating therewith to lock the latch bolt in a locking position, and means cooperating with the said outer knob to restrict said knob from rotation when the latch bolt is in the locked position, the inner knob having said slidable trigger device extending longitudinally therethrough, means operable by the partial rotation of the inner knob to unlock the said latch bolt, the unlocking of said latch bolt releasing the trigger for movement in one direction, the unlocking of the latch bolt permitting rotation of the outer knob and means actuated by the movement of the trigger in the opposite direction to lock the said latching bolt and thereby prevent rotation of the outer knob.

2. A door knob lock, comprising in combination an outer and an inner knob on opposite sides of a door with a cage-like structure fitted in the door with the knobs connected thereto and a latch bolt extending from the cage structure to the edge of the door, a rotatable lock in the outer knob with means actuated thereby to lock the latch bolt in a locking position, including a trigger device slidable longitudinally in the inner knob and means to lock the said trigger in one position on the locking of the latch bolt, means actuated by a partial rotation of the inner knob to release the trigger and the latch bolt and permit partial rotation of the outer knob, means to move the trigger in one direction on unlocking same, and means cooperating with the trigger on movement in a reverse direction to lock the latch bolt in locked position and prevent rotation of the outer knob.

3. A door knob lock, comprising in combination a cage, an outer and an inner knob on opposite sides of said cage and connected thereto the said cage being adapted to fit in an opening transversely through a door, a slidably cross head in the cage, a latch bolt connected to the cross head and adapted to extend beyond the edge of the door, a lock in the outer knob, a slidable trigger device extending longitudinally of the inner knob and positioned to engage the cross head, a lock in the outer knob and means cooperating therewith to latch the trigger and hence the cross head and latch bolt in a locking position, an unlatching means operable by a partial rotation of the inner knob to release the trigger for movement in one direction, the trigger after such movement releasing the cross head and means operable by either knob to shift the cross head and thereby the latch bolt.

4. A door knob lock as claimed in claim 3, the trigger device being spring operable and shiftable outwardly on unlatching and means actuated by the inward movement of the trigger to latch the same and to lock the cross head and latch bolt from operation by the outer knob.

5. A door knob lock, comprising in combination an outer and an inner knob adapted to fit on opposite sides of a door with a latch bolt extending beyond the margin of the door, a lock in the outer knob, a trigger device slidable longitudinally of the inner knob, a detent, means operable by the lock to shift the said trigger and move the detent into a latching position in reference to the trigger, means cooperating with the trigger to lock the latch bolt in locking position, means operable by a partial rotation of the inner knob to release the detent, and a releasing means to move the trigger into a releasing position, the trigger in such position releasing or unlocking the latch bolt, and means operable by the outer knob to actuate the latch bolt to unlatch the door.

6. A door knob lock as claimed in claim 5, a spring means operating with the trigger to shift such trigger outwardly on release of the detent, and means actuated by the inward movement of the trigger in cooperation with the detent to engage the detent and the trigger with each other to restrain the trigger from movement and hence lock the latch bolt from unlocking operation by the outer knob unless released by the lock.

7. A door knob lock, comprising in combination a guide structure adapted to fit in a transverse opening in a door and having an outer and an inner knob connected thereto, a cross head slidable in the said guide and having a latch bolt connected thereto, a bar-like trigger slidable in the inner knob, a detent to engage the said trigger, means actuated by the trigger to lock the latch bolt, a lock in the outer knob, means cooperating with the lock to shift the trigger into or out of a locking position, the said trigger in the locked position being housed innermost in the said knob, a spring coacting with the trigger to force the same outwardly, means actuated by partial rotation of the inner knob to release the detent to allow outward movement of the trigger, the outward movement of the trigger releasing the cross head for longitudinal movement by actuation of either of the knobs.

8. A door knob lock having a tubular cage adapted to fit in an opening in a door with a guide box structure therein and a cross head slidable in the guide box, a latch bolt connected to the cross head, an inner and an outer knob rotatably mounted on the said cage, a lock in the outer knob, means actuated by the said lock to lock or unlock the latch bolt, means operable by partial rotation of the inner knob to unlock the latch bolt, whereby said bolt may be operated by either knob to open or close the door, and means cooperating with the inner knob to lock the latch bolt in its locking position and to prevent operation thereof by the outer knob unless the lock in the outer knob is operated.

9. A door knob lock as claimed in claim 8, a latch bolt housing connected to the said cage and being adapted to fit in an opening from the edge of the door.

10. A door knob lock, comprising in combination a tubular cage having a guide box structure therein with a slidable cross head in the guide box structure, the cage being adapted to fit in a transverse opening in a door, a bolt housing connected to the cage and adapted to fit in the opening in the door from an edge and to be connected to the cage, the said bolt housing having a latch bolt slidable therein, the said bolt being connected to the cross head, an outer and an inner knob rotatable on the cage each to engage and move the cross head, a lock in the outer knob, means actuated thereby to lock the cross head and hence the bolt in a locking position, means actuated by a partial rotation of the inner knob to unlock the cross head for movement of the said bolt, and a slidable releasing means in the inner knob to lock the cross head and hence the bolt, the locking of the cross head preventing operation thereof by the outer knob unless the lock in such knob is operated.

11. A door knob lock as claimed in claim 10, the releasing means in the inner knob comprising a bar-like trigger with a spring to operate said trigger outwardly, a detent to restrain the trigger in an innermost position, means operable by the lock in the outer knob to draw the trigger inwardly, the detent being operable to engage and hold the trigger in locked position, means actuated by the said lock to release the detent and permit movement of the trigger to the unlocking position, the trigger when in the outer position being shiftable in the inner knob from adjacent such knob to a locking position.

12. A door knob lock, comprising in combination a tubular cage adapted to fit in a transverse opening in a door and having a box-like guide therein with a cross head slidable in the guide, the said cross head being formed in two parts resiliently connected, a bolt housing connected to the cage and having a latch bolt with a connection to one of the movable parts of the cage, the bolt housing being adapted to fit in an opening in the edge of the door and forming a means to prevent rotation of the cage, a door knob rotatably mounted in reference to the cage and the said guide and cross head, interengaging means between each knob and the cross head to shift the same, there being a lost motion device in the cross head, a lock in the outer knob, and means actuated thereby to lock the cross head and hence the latch bolt or to unlock same by operation of the lock, means cooperating with the inner knob on partial rotation thereof to unlock the cross head, whereby such cross head and bolt may be operated by the outer knob independent of the lock and a slidable restraining device in the inner knob, said device moving in one direction on unlocking of the cross head, the movement of the said device in the opposite direction locking the cross head and hence the latch bolt from operation by the outer knob.

13. In a door knob lock, a cage adapted for insertion in a transverse opening in a door, an inner knob rotatably mounted thereon, a latch bolt extending from the cage, a trigger slidable longitudinally of the knob with a tensioning spring to thrust said trigger outwardly, a detent device cooperating with the trigger and engaging the trigger when thrust inwardly, the trigger having means to lock the latch bolt, means operable by the partial rotation of the inner knob to actuate the detent to release the trigger and thereby release the said lock, the trigger on its release being shifted outwardly.

14. In a door knob lock having knobs adapted for location on opposite sides of a door and a slidable bolt, a slidable cross head to be fitted in the door, having an inner and an outer part, the outer part being connected to the latch bolt, a lost motion connection between the two parts, with a spring mounted to separate such parts, means on the knobs to engage the inner part of the cross head to shift same inwardly, a slidable trigger device, means on the outer part of the cross head to engage the trigger and to prevent inward movement of the trigger, and means operable by one of the knobs to release the trigger to allow inward movement of the said latch.

15. In a door knob lock having a cage structure to fit in a door with inner and outer knobs on opposite sides thereof and a slidable bolt, a bar-like trigger extending longitudinally through the inner knob, a spring means tensioned to shift said trigger partly out of the inner knob, a lock in the outer knob, means actuated by the lock to engage the trigger and draw the trigger inwardly, a pivoted detent positioned to engage the trigger when in its innermost position and retain the trigger therein, means cooperating with the trigger to prevent inward motion of the bolt and means actuated by the rotation of the inner knob to release the detent for outward movement of the trigger.

16. In a door knob lock, a cage structure to fit in a door, an inner and an outer knob, a plate having spring clips connected thereto, a cap molding rotatably mounted on one of the knobs and having projections to engage the spring clips to retain the said molding cap in position.

In testimony whereof I have signed my name to this specification.

HENRY L. ARSTE.